US012610984B2

(12) United States Patent
Shi et al.

(10) Patent No.: US 12,610,984 B2
(45) Date of Patent: Apr. 28, 2026

(54) E-CIGARETTE, E-CIGARETTE VAPORIZER, AND VAPORIZATION ASSEMBLY WITH CURVED RESISTANCE HEATING TRAJECTORY

(71) Applicant: SHENZHEN FIRST UNION TECHNOLOGY CO., LTD., Shenzhen (CN)

(72) Inventors: Wen Shi, Shenzhen (CN); Xiaofei Zhang, Shenzhen (CN); Jun Yuan, Shenzhen (CN); Jiamao Luo, Shenzhen (CN); Baoling Lei, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 474 days.

(21) Appl. No.: 18/022,271

(22) PCT Filed: Aug. 20, 2021

(86) PCT No.: PCT/CN2021/113797
§ 371 (c)(1),
(2) Date: Feb. 20, 2023

(87) PCT Pub. No.: WO2022/037678
PCT Pub. Date: Feb. 24, 2022

(65) Prior Publication Data
US 2023/0320423 A1 Oct. 12, 2023

(30) Foreign Application Priority Data
Aug. 20, 2020 (CN) ........................ 202010855599.2

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/44* (2020.01); *H05B 3/265* (2013.01);
(Continued)

(58) Field of Classification Search
CPC .......... A24F 40/10; A24F 40/46; A24F 40/00; A24F 40/40; A24F 47/00; H05B 3/26;
(Continued)

(56) References Cited

U.S. PATENT DOCUMENTS

2011/0277756 A1 11/2011 Terry et al.
2014/0109921 A1 4/2014 Chen
(Continued)

FOREIGN PATENT DOCUMENTS

CN 205492631 U 8/2016
CN 107801375 A 3/2018
(Continued)

OTHER PUBLICATIONS

Translation of CN 210520094 U (Year: 2020).*
Translation of CN 211153810 U (Year: 2020).*

*Primary Examiner* — Michael H. Wilson
*Assistant Examiner* — Michael Patrick Mullen
(74) *Attorney, Agent, or Firm* — PROI Intellectual Property US

(57) ABSTRACT

An e-cigarette, an e-cigarette vaporizer, and a vaporization assembly are provided. The e-cigarette vaporizer includes: a liquid storage cavity, configured to store a liquid substrate; a porous body, in fluid communication with the liquid storage cavity to absorb the liquid substrate; and a heating
(Continued)

element, including a first electrode connection portion, a second electrode connection portion, and a resistance heating trajectory extending between the first electrode connection portion and the second electrode connection portion. A curvature of any position on a part of the resistance heating trajectory close and connected to the first electrode connection portion and/or the second electrode connection portion is not zero. The heating element of the e-cigarette vaporizer adopts the resistance heating trajectory to perform heating, and causes a part of the resistance heating trajectory that is close and connected to an electrode connection portion to be in a bending shape whose curvature is not zero.

16 Claims, 8 Drawing Sheets

(51) Int. Cl.
*A24F 40/44* (2020.01)
*H05B 3/26* (2006.01)

(52) U.S. Cl.
CPC .. *H05B 2203/003* (2013.01); *H05B 2203/016* (2013.01); *H05B 2203/021* (2013.01)

(58) Field of Classification Search
CPC .............. H05B 3/265; H05B 2203/002; H05B 2203/003; H05B 2203/016; H05B 2203/021; H05B 2203/013
See application file for complete search history.

(56) References Cited

U.S. PATENT DOCUMENTS

| | | | | |
|---|---|---|---|---|
| 2017/0164655 | A1 | 6/2017 | Chen | |
| 2018/0168225 | A1 | 6/2018 | Zinovik et al. | |
| 2019/0174828 | A1 | 6/2019 | Holtz et al. | |
| 2019/0297946 | A1 | 10/2019 | Fu et al. | |
| 2021/0000179 | A1 * | 1/2021 | Li | A24F 40/44 |

FOREIGN PATENT DOCUMENTS

| | | | | |
|---|---|---|---|---|
| CN | 208624642 | U | 3/2019 | |
| CN | 110089778 | A | 8/2019 | |
| CN | 110384258 | A | 10/2019 | |
| CN | 110432557 | A | 11/2019 | |
| CN | 210520094 | U | 5/2020 | |
| CN | 210630649 | U | 5/2020 | |
| CN | 211153810 | U | 8/2020 | |
| CN | 212590295 | U | 2/2021 | |
| RU | 2690638 | C | 6/2019 | |
| RU | 2690638 | C2 | 6/2019 | |
| WO | 2016172441 | A1 | 10/2016 | |
| WO | 2017005471 | A1 | 1/2017 | |
| WO | 2019035056 | A1 | 2/2019 | |
| WO | WO-2019157651 | A1 * | 8/2019 | A24F 40/44 |

* cited by examiner

E-CIGARETTE, E-CIGARETTE VAPORIZER, AND VAPORIZATION ASSEMBLY WITH CURVED RESISTANCE HEATING TRAJECTORY

CROSS-REFERENCE TO RELATED APPLICATIONS

The application is a 35 U.S.C. § 371 National Phase conversion of International PCT) Patent Application No. PCT/CN2021/113797, filed on Aug. 20, 2021, which claims priority to Chinese Patent Application No. 202010855599.2, entitled "E-CIGARETTE, E-CIGARETTE VAPORIZER, AND VAPORIZATION ASSEMBLY" and filed with the China National Intellectual Property Administration on Aug. 20, 2020, which is incorporated herein by reference in its entirety. The PCT International Patent Application was filed and published in Chinese.

TECHNICAL FIELD

Embodiments of this application relate to the technical field of aerosol-generation apparatuses, and in particular, to an e-cigarette, an e-cigarette vaporizer, and a vaporization assembly.

BACKGROUND

During use of tobacco products (for example, a cigarette or cigar), tobaccos are burnt to generate tobacco vapor. People are trying to manufacture products releasing compounds without burning to replace the products that burn tobaccos.

An example of the products is a heating apparatus, which releases compounds by heating rather than burning materials. For example, the materials may be tobaccos or other non-tobacco products, where the non-tobacco products may include or not include nicotine. An aerosol-providing product is provided as another example, and for example, an e-cigarette apparatus is provided. The apparatus generally includes liquid, and the liquid is vaporized after being heated, so as to generate inhalable vapor or aerosols. The liquid may include nicotine and/or fragrance and/or aerosol-generation substances (for example, glycerol).

A core component of a known e-cigarette product is a vaporization assembly for vaporizing the liquid to generate aerosols. The vaporization assembly includes a porous body configured to absorb and transmit liquid and a heating element arranged on the porous body and configured to heat and vaporize the liquid absorbed and transmitted by the porous body. Capillary micropores are provided inside the porous body, and the porous body may absorb the liquid and transmit the liquid to the heating element through the micropores inside the porous body. During operation of a known heating element, a main heating region is centralized at a middle part of the heating element, and a temperature of a part close to an edge is relatively low, namely, temperatures of various parts of the heating element vary gradually. During operation, under an impact effect of cold-hot cycling, parts under different temperatures may shrink or expand to different degrees. As a result, the heating element may be bent or broken, reducing a service life of a vaporization core.

SUMMARY

An objective of an embodiment of this application is to provide an e-cigarette vaporizer, configured to vaporize a liquid substrate to generate inhalable aerosols, and the e-cigarette vaporizer including: a liquid storage cavity, configured to store the liquid substrate; a porous body, in fluid communication with the liquid storage cavity to absorb the liquid substrate; and a heating element, formed on the porous body and configured to heat the liquid substrate in at least a part of the porous body to form aerosols, where the heating element includes a first electrode connection portion, a second electrode connection portion, and a resistance heating trajectory extending between the first electrode connection portion and the second electrode connection portion; the resistance heating trajectory includes a first part close and connected to the first electrode connection portion and a second part close and connected to the second electrode connection portion; and a curvature of any position on the first part and/or the second part is not zero.

The heating element of the e-cigarette vaporizer adopts a specially designed resistance heating trajectory to perform heating, and causes a temperature difference when the resistance heating trajectory is close and connected to an electrode connection portion to be mostly in a bending shape whose curvature is not zero. Therefore, a stress state of this part during cold-hot impact is changed, so that internal stress formed due to a deformation difference is partly eliminated or dispersed, and the heating element is prevented from being deformed or broken under cold-hot cycling.

In a more exemplary implementation, the resistance heating trajectory is constructed to include only limited points whose curvature is zero in the entire trajectory. According to the structure, the entire heating trajectory is a trajectory in which curves with different bending directions are connected, and a stress state of the heating trajectory during cold-hot impact is entirely optimized.

In a more exemplary implementation, the resistance heating trajectory is constructed to be connected to the electrode connection portion; and a straight line runs through a connection point between the resistance heating trajectory and the electrode connection portion and intersects with the resistance heating trajectory at two intersection points, where a distance between the two intersection points is greater than a distance between the connection point and an adjacent intersection point. According to the setting, a high temperature difference of the resistance heating trajectory is reduced, and temperature distribution features around the connection point are improved, thereby further improving the stress state during cold-hot impact.

In a more exemplary implementation, the first part and the second part are symmetrical. In a specific optional implementation, the symmetrical may be axially symmetrical, centrally symmetrical, rotationally symmetrical.

In a more exemplary implementation, the first part and/or the second part are/is constructed to be in a shape of an arc with a constant curvature.

In a more exemplary implementation, a curvature of the first part and/or the second part varies.

In a more exemplary implementation, the porous body includes a vaporization surface, and the heating element is formed on the vaporization surface.

In a more exemplary implementation, the vaporization surface is a flat plane.

In a more exemplary implementation, the vaporization surface includes a length direction and a width direction perpendicular to the length direction;

- the first electrode connection portion and the second electrode connection portion are sequentially arranged along the length direction; and an area of a region defined by a straight line running through a joint of the first part and the first electrode connection portion along the width direction and a straight line running through a joint of the second part and the second electrode connection portion along the width direction in the vaporization surface is less than two thirds of an area of the vaporization surface.

In a more exemplary implementation, the vaporization surface includes a length direction and a width direction perpendicular to the length direction; and the first part and/or the second part are/is constructed to bend outward along the width direction.

In a more exemplary implementation, an extension length of the first part and/or the second part is defined to be less than one eighth of an extension length of the resistance heating trajectory.

In a more exemplary implementation, the resistance heating trajectory is in a circuitous or alternately bending shape.

In a more exemplary implementation, the resistance heating trajectory includes at least one bending direction change point; and a part between a bending direction change point close to the first electrode connection portion and the first electrode connection portion forms the first part, and a part between a bending direction change point close to the second electrode connection portion and the second electrode connection portion forms the second part.

In a more exemplary implementation, bending directions of the first part and the second part are opposite.

In a more exemplary implementation, the resistance heating trajectory includes a first bending direction change point close to the first electrode connection portion and a second bending direction change point close to the second electrode connection portion, a part between the first bending direction change point and the first electrode connection portion forms the first part, and a part between the second bending direction change point and the second electrode connection portion forms the second part.

In a more exemplary implementation, the resistance heating trajectory further includes a third part located between the first bending direction change point and the second bending direction change point, where bending directions of the third part and the first part are opposite; and/or bending directions of the third part and the second part are opposite.

In a more exemplary implementation, a curvature of any position on the third part is not zero.

In a more exemplary implementation, a curvature of the first part and/or the second part is greater than that of the third part.

In a more exemplary implementation, a straight line running through a joint of the first part and the first electrode connection portion and the first bending direction change point is provided in the vaporization surface, and the straight line includes an intersection point with the third part; and a distance between the joint of the first part and the first electrode connection portion and the first bending direction change point is less than a distance between the first bending direction change point and the intersection point.

In a more exemplary implementation, a width of the resistance heating trajectory is basically constant.

In a more exemplary implementation, a width of the resistance heating trajectory ranges from 0.2 mm to 0.5 mm; and/or an extension length of the resistance heating trajectory ranges from 5 mm to 50 mm; and/or a resistance value of the resistance heating trajectory ranges from 0.5Ω to 2.0Ω.

In a more exemplary implementation, the resistance heating trajectory is in a circuitous or alternately bending shape.

In a more exemplary implementation, the first electrode connection portion and/or the second electrode connection portion are/is basically located in a center of the vaporization surface along the width direction.

In a more exemplary implementation, the porous body includes a porous ceramic.

This application further provides an e-cigarette, including a vaporization apparatus configured to vaporize a liquid substrate to generate inhalable aerosols and a power supply apparatus configured to supply power to the vaporization apparatus, where the vaporization apparatus includes the e-cigarette vaporizer described above.

This application further provides a vaporization assembly for an e-cigarette, including a porous body configured to absorb a liquid substrate and a heating element formed on the porous body, where the heating element includes a first electrode connection portion, a second electrode connection portion, and a resistance heating trajectory extending between the first electrode connection portion and the second electrode connection portion; the resistance heating trajectory includes a first part close and connected to the first electrode connection portion and a second part close and connected to the second electrode connection portion; and a curvature of any position on the first part and/or the second part is not zero.

BRIEF DESCRIPTION OF THE DRAWINGS

One or more embodiments are exemplarily described with reference to the corresponding figures in the accompanying drawings, and the descriptions do not constitute a limitation to the embodiments. Components in the accompanying drawings that have same reference numerals are represented as similar components, and unless otherwise particularly stated, the figures in the accompanying drawings are not drawn to scale.

DETAILED DESCRIPTION

For ease of understanding of this application, this application is described below in more detail with reference to accompanying drawings and specific implementations.

Figure 1:
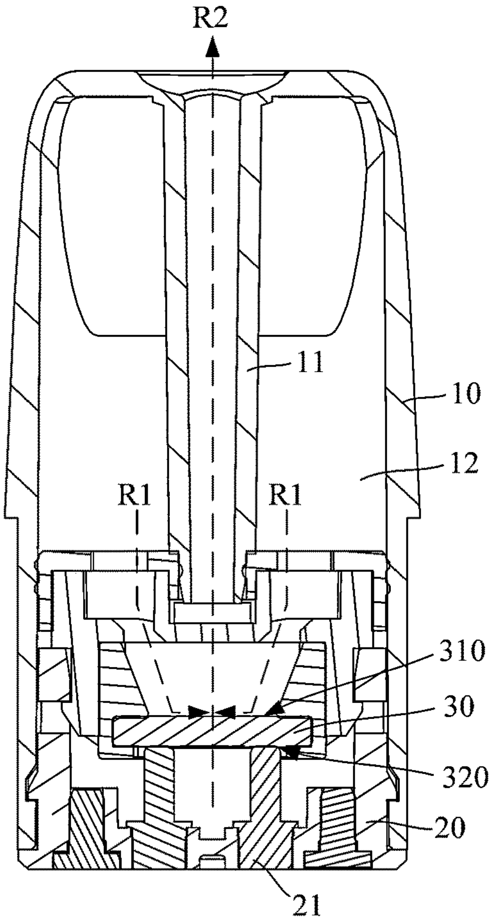
FIG. 1 is a schematic structural diagram of an e-cigarette vaporizer according to an embodiment of this application.

An embodiment of this application provides an e-cigarette vaporizer, configured to heat and vaporize a liquid substrate to generate inhalable aerosols. FIG. 1 shows a schematic structural diagram of an e-cigarette vaporizer according to an embodiment. The e-cigarette vaporizer includes:

- a main housing 10, where the main housing 10 is substantially in a shape of a hollow cylinder, and a hollow part in the main housing is a necessary functional device configured to store and vaporize the liquid substrate; and in FIG. 1, a lower end serving as an opening of the main housing 10 along a length direction is provided with an end cap 20 for closing the lower end of the main housing 10.

The main housing 10 is internally provided with:

- a vapor output tube 11 extending along an axial direction, providing a vapor output channel configured to output the formed aerosols to an upper end for inhalation; and
- a liquid storage cavity 12 formed between the vapor output tube 11 and an inner wall of the main housing 10, configured to store the liquid substrate.

The main housing 10 is further internally provided with a porous body 30. The porous body 30 is in a shape of a sheet or a block in an exemplary implementation shown in FIG. 1, and includes a liquid absorbing surface 310 and a vaporization surface 320 opposite to each other along the axial direction of the main housing 10, where:

- the liquid absorbing surface 310 is an upper surface of the porous body 30 in FIG. 1 and is in fluid communication with the liquid storage cavity 12, so that the liquid substrate in the liquid storage cavity 12 may be transmitted to the upper surface 310 and absorbed along a direction shown by an arrow R1 during use; and
- the vaporization surface 320 is a lower surface of the porous body 30 in FIG. 1, and a heating element 40 is arranged on the vaporization surface and is configured to heat and vaporize at least a part of the liquid substrate in the porous body 30 to generate inhalable aerosols. The vaporization surface 320 is in air communication with the vapor output tube 11, so that after the generated aerosols are released or escape through the vaporization surface 320, the aerosols are outputted by the vapor output tube 11 along a direction shown by an arrow R2.

Figure 2:
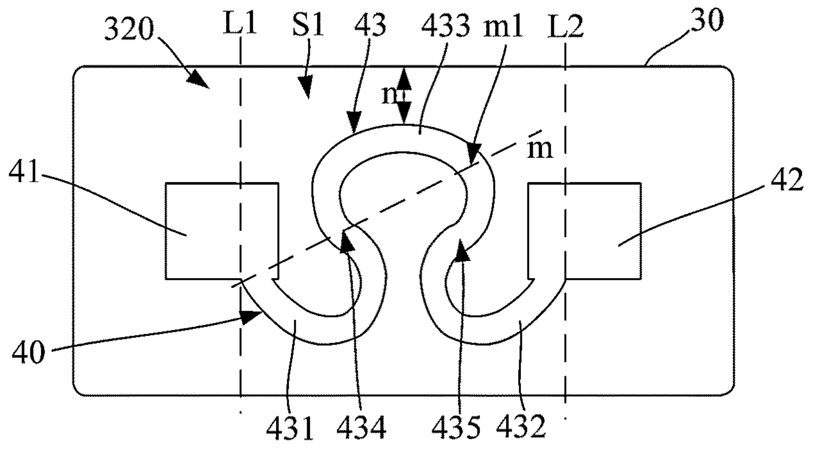
FIG. 2 is a schematic structural diagram of a heating element according to an embodiment.

FIG. 2 shows a schematic diagram of a heating element 40 formed on the vaporization surface 320 of the porous body 30. In an exemplary implementation of FIG. 2, the vaporization surface 320 is a rectangular structure extending along a transverse direction of the main housing 10. The porous body 30 is generally prepared by a porous ceramic, an inorganic porous material, or a porous rigid material, and a most common porous ceramic used for the e-cigarette vaporizer includes a silicone ceramic such as silicon oxide, silicon carbide, or silicon nitride, an aluminum ceramic such as aluminum nitride or aluminum oxide, or at least one of a zirconium oxide ceramic or a diatomite ceramic; and a pore size of each micropore of the porous body 30 preferably ranges from 5 μm to 60 μm, and a porosity thereof ranges from 30% to 60%.

In the implementation shown in FIG. 2, the heating element 40 includes a first electrode connection portion 41 close to one side of a length direction of the vaporization surface 320 and a second electrode connection portion 42 close to the other side of the length direction of the vaporization surface 320; and during use, the first electrode connection portion 41 and the second electrode connection portion 42 form an electrical connection by abutting or welding positive/negative electrodes 21 in FIG. 1, to further supply power to the heating element 40.

In an exemplary implementation shown in FIG. 2, the first electrode connection portion 41 and the second electrode connection portion 42 are constructed to be substantially in a rectangular shape, or may be in a circular or an elliptical shape in other optional implementations. In terms of materials, the first electrode connection portion 41 and the second electrode connection portion 42 are preferentially made of materials such as golden or silver with a low coefficient of resistance and high conductive performance.

The heating element 40 further includes a resistance heating trajectory 43 extending between the first electrode connection portion 41 and the second electrode connection portion 42. Based on a requirement for heating and vaporization functions, the resistance heating trajectory 43 is generally made of a resistive metal material or metal alloy material with suitable impedance. For example, the suitable metal or alloy material includes at least one of nickel, cobalt, zirconium, titanium, nickel alloy, cobalt alloy, zirconium alloy, titanium alloy, nickel-chromium alloy, nickel-iron alloy, iron-chromium alloy, titanium alloy, iron-manganese-aluminum alloy, or stainless steel.

In an exemplary implementation of FIG. 2, the resistance heating trajectory 43 includes a first part 431 close and connected to the first electrode connection portion 41 and a second part 432 close and connected to the second electrode connection portion 42; and the first part 431 and the second part 432 are constructed to be in a bending rather than a flat-straight shape. In an exemplary implementation, the first electrode connection portion 41 and the second electrode connection portion 42 are located in a center of the vaporization surface 320 along a width direction.

Alternatively, in other optional implementations, the first electrode connection portion 41 and the second electrode connection portion 42 are arranged in an interleaved manner along a width direction of the vaporization surface 320. For example, the first electrode connection portion 41 is close to a lower side end along the width direction of the vaporization surface 320, and the second electrode connection portion 42 is close to an upper side end along the width direction of the vaporization surface 320.

Figure 3:
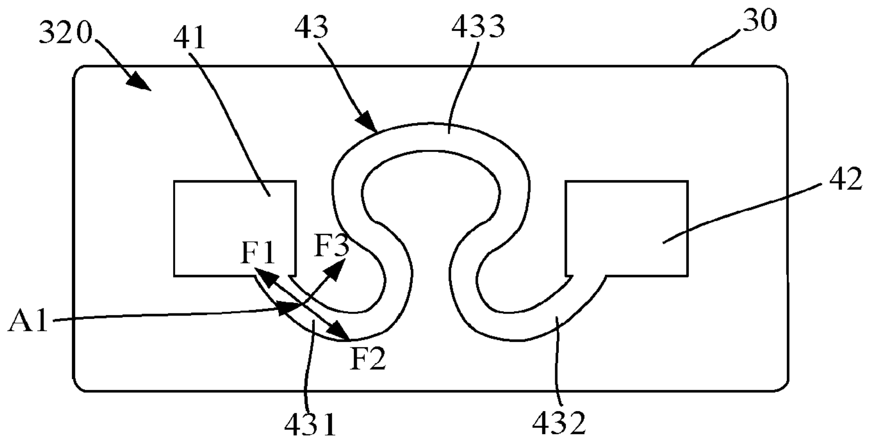
FIG. 3 is a schematic diagram of a bending part of the heating element in FIG. 2 forming stress under cold-hot impact.

During implementation, temperatures of the first electrode connection portion 41 and the second electrode connection portion 42 are relatively low; and the first part 431 and/or the second part 432 are/is away from a central high temperature region of the resistance heating trajectory 43, so that the first part 431 and/or the second part 432 are/is located at a part with greatest temperature changes, and internal stress generated due to a deformation difference during cold-hot cycling is relatively great. By designing the first part 431 and/or the second part 432 to be in a bending shape, an effect of tensile stress in three directions on any position is shown in A1 in FIG. 3, where the tensile stress includes tensile stress F1 and F2 in opposite directions generated due to different temperature differences on two sides along an extending direction and tensile stress F3 in a bending direction. Therefore, the tensile stress may offset each other through resolution of forces, thereby effectively preventing the heating element from being deformed or broken under cold-hot cycling.

In an exemplary implementation shown in FIG. 2, the first part 431 and/or the second part 432 are/is in a shape of an arc with a constant curvature. Alternatively, in a variant implementation shown in FIG. 4, a curvature of a first part 431*a* and/or a second part 432*a* varies.

Further, in an exemplary implementation, referring to FIG. 2, a straight line L1 running through a joint of the first electrode connection portion 41 and the first part 431 exists in the width direction of the vaporization surface 320, and a straight line L2 running through a joint of the second electrode connection portion 42 and the second part 432 exists in the width direction of the vaporization surface 320; and the resistance heating trajectory 43 is arranged between the straight line L1 and the straight line L2. In addition, an area of a region S1 defined between the straight line L1 and the straight line L2 does not exceed two thirds of a total area of the vaporization surface 320. More preferably, the area of the region S1 does not exceed a half of the total area of the vaporization surface 320.

In an exemplary implementation shown in FIG. 2, a length of the vaporization surface 320 of the block-shaped porous body 30 is about 8 mm, and a width thereof is about 4.2 mm. A distance between L1 and a left side end is about 1.8 mm, namely, a length of the region S1 defined between the straight line L1 and the straight line L2 is about 4.4 mm, and the area is slightly less than a half of the total area of the vaporization surface 320. This structure is conducive to centralize a main heating region that the resistance heating trajectory 43 can radiate in a most suitable part of the vaporization surface 320.

Generally, during implementation, the first part 431 and/or the second part 432 are/is a part of the resistance heating trajectory 43; and the first part and/or the second part are/is not apparently or significantly distinguished from other parts in terms of shape or color or material that is visible to naked eyes.

Generally, during implementation, it is defined as reasonable when a length of the first part 431 and/or the second part 432 is less than about one eighth of a total extension length of the resistance heating trajectory 43. For example, in the shape and size of the resistance heating trajectory 43 in FIG. 2, the length of the first part 431 and/or the second part 432 approximately ranges from 2 mm to 3 mm, and the total extension length after the resistance heating trajectory 43 is unfolded approximately ranges from 5 mm to 50 mm. During use, a temperature difference on the first part 431 and/or the second part 432 defined according to this size ratio is relatively apparent, which is exactly a part where stress is centralized and may be easily broken.

Alternatively, in still another implementation shown in FIG. 2, the first part 431 and the second part 432 are defined by a bending direction change position of the alternately bending resistance heating trajectory 43. Specifically, as can be seen from FIG. 2, the resistance heating trajectory 43 includes a first bending direction change point 434 and a second bending direction change point 435. The first bending direction change point 434 is close to the first electrode connection portion 41, a part between the first bending direction change point 434 and the first electrode connection portion 41 serves as the first part 431, and a part between the second bending direction change point 435 and the second electrode connection portion 42 serves as the second part 432.

Meanwhile, the resistance heating trajectory 43 further includes a third part 433 located between the first bending direction change point 434 and the second bending direction change point 435. Certainly, the third part 433 is also in a bending shape on which a curvature of any position is not zero, which is not a flat-straight shape. According to FIG. 2, a bending direction of the third part 433 is opposite to that of the first part 431 and/or the second part 432.

In addition, a curvature of the first part 431 and/or the second part 432 is greater than a curvature of the third part 433. The third part 433 has a wider heat radiation range which can cover the first part 431 and/or the second part 432 as much as possible, thereby reducing a temperature difference of the first part and/or the second part 432.

In the implementation shown in FIG. 2, a width of the resistance heating trajectory 43 is about 0.35 mm and is basically constant. Based on a requirement that a resistance value of the heating element 40 generally ranges from 0.5Ω to 2.0Ω, the width of the resistance heating trajectory 43/43*a* may range from 0.2 mm to 0.5 mm.

Figure 10:
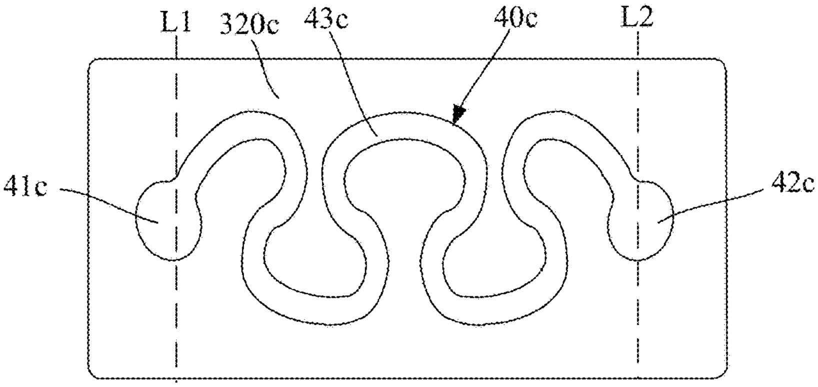
FIG. 10 is a schematic structural diagram of a heating element according to another comparative embodiment.

In a specific product implementation, FIG. 10 shows an observation diagram of a resistance heating trajectory 43*c* prepared for an existing classic low-power cigarette under a microscope. A total extension length of the resistance heating trajectory 43*c* ranges from 10.5 mm to 10.6 mm, a line width thereof is 0.35 mm, and a resistance value thereof is 1.1Ω (a tolerance is within ±0.15).

Further, in an exemplary implementation of FIG. 2, according to the structure, the resistance heating trajectory 43 includes a straight line m running through the joint of the first electrode connection portion 41 and the first part 431 and the first bending direction change point 434, where the straight line m includes an intersection point m1 with the third part 433 of the resistance heating trajectory 43. A distance between the joint of the first electrode connection portion 41 and the first part 431 and the first bending direction change point 434 is less than a distance between the first bending direction change point 434 and the intersection point m1. According to this structure, a main temperature region of the resistance heating trajectory 43 can be close to or cover the first electrode connection portion 41 or the first part 431, thereby helping prevent a temperature difference on two sides of the first part 431 during operation from being excessively great, leading to generation of great internal stress during cold-hot cycling.

In an exemplary implementation shown in FIG. 2, the resistance heating trajectory 43 is in a shape similar to "Ω", and a temperature field formed by the resistance heating trajectory 43 in the shape is substantially in a shape of a relatively uniform circle.

In terms of an exemplary shape and position shown in FIG. 2, a shortest distance between the resistance heating trajectory 43 and the upper side end or lower side end of the vaporization surface 320 is less than one fifth of a width of the vaporization surface 320, so that a main heating temperature radiation region of the resistance heating trajectory 43 does not exceed the vaporization surface 320 as much as possible. For example, in FIG. 2, the shortest distance n between the resistance heating trajectory 43 and the upper side end and lower side end of the vaporization surface 320 is about 0.8 mm. In a variant shown in FIG. 2, the shortest distance n between the resistance heating trajectory 43 and the upper side end of the vaporization surface 320 may be further increased to 1.2 mm, namely, the resistance heating trajectory 43 shown in FIG. 2 and FIG. 4 may be designed to be flatter, which is possibly conducive to temperature centralization.

Figure 4:
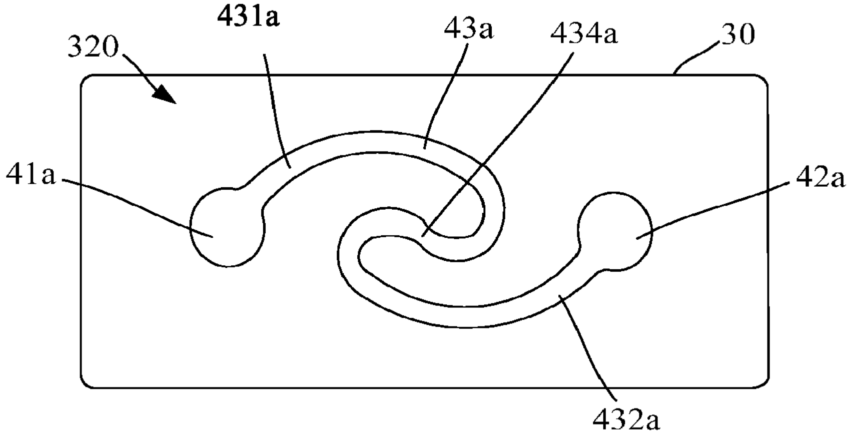
FIG. 4 is a schematic structural diagram of a heating element according to another embodiment.

In an optional implementation, referring to FIG. 4, the resistance heating trajectory 43*a* may be substantially in a shape of S. Any position, especially a first part 431*a* and/or a second part 432*a*, of the resistance heating trajectory 43*a* is bending. Therefore, in addition to causing a temperature of each position to coincide with each other for transition, internal tensile stress generated due to a deformation difference may be further eliminated, thereby preventing the heating element from being deformed or broken. Similarly, an arrangement position of the resistance heating trajectory 43*a* and a size gap between the resistance heating trajectory and each side end of a vaporization surface 320*a* may also be set according to the positions in FIG. 2. In FIG. 4, the first part 431*a* and/or the second part 432*a* may also be defined by a ratio of an extension length of the entire resistance heating trajectory 43*a* or may be defined by a bending direction change point 434*a*.

Further, in the foregoing implementations, bending of the resistance heating trajectory 43/43*a* is alternately circuitous, to cause the resistance heating trajectory 43/43*a* in a given area to extend by a sufficient length, thereby obtaining a required resistance value.

In an exemplary implementation shown in FIG. 2 and FIG. 4, the first part 431/431*a* and/or the second part 432/432*a* bend/bends outward rather than bending inward along the width direction of the vaporization surface 320/320*a*.

Figure 5:
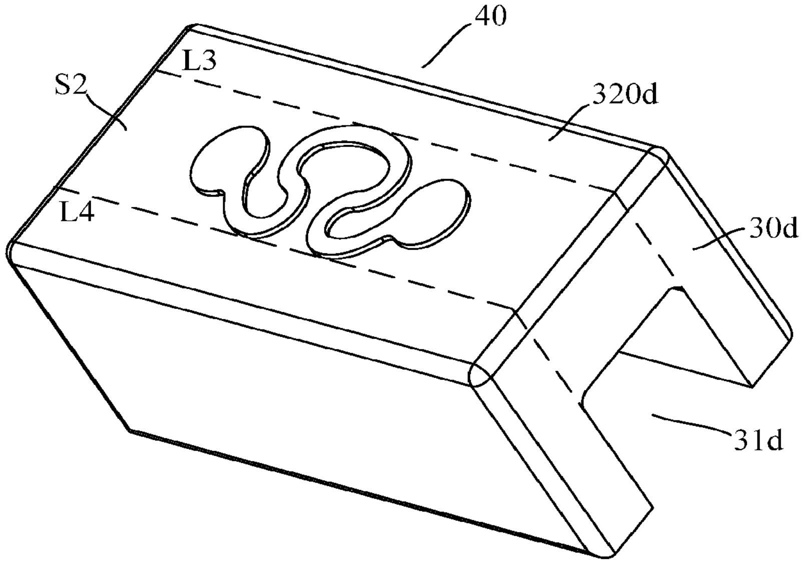
FIG. 5 is a schematic structural diagram of a porous body according to another embodiment.

In other optional implementations, the shape of the porous body 30 may vary arbitrarily. For example, FIG. 5 shows a structure of a porous body 30*d* in a common shape, which includes a vaporization surface 320*d* configured to form the heating element 40. A structure such as a groove 31*d* is provided on a surface opposite to the vaporization surface 320*d*, and space of the groove 31*d* helps shorten a transmission distance of a liquid substrate to the vaporization surface 320*d*.

Further, in the implementation shown in FIG. 5, the vaporization surface 320*d* includes a projection region S2 (namely, a part between dashed lines L3 and L4 in FIG. 5) corresponding to the groove 31*d*, and the heating element 40 is located within the projection region S2 corresponding to the groove 31*d* on the vaporization surface 320*d*. Therefore, the liquid substrate can be smoothly and quickly transmitted to the heating element 40 during use.

An embodiment of this application further provides a vaporization assembly for an e-cigarette vaporizer, including a porous body 30 configured to absorb a liquid substrate and a heating element 40 formed on the porous body 30, where the heating element 40 includes a first electrode connection portion 41, a second electrode connection portion 42, and a resistance heating trajectory 43 extending between the first electrode connection portion 41 and the second electrode connection portion 42; the resistance heating trajectory 43 includes a first part 431 close and connected to the first electrode connection portion 41 and a second part 432 close and connected to the second electrode connection portion 42; and a curvature of any position on the first part 431 and/or the second part 432 is not zero.

An embodiment of this application further provides a method for preparing a vaporization assembly of an e-cigarette vaporizer. The vaporization assembly includes the porous body 30 and the heating element 40. In an embodiment, a process of the preparation method is performed by performing sintering after performing surface mounted technology (SMT)-based laser printing, which has higher precision when compared with an existing manner of performing sintering after performing SMT-based screen printing.

Figure 6:
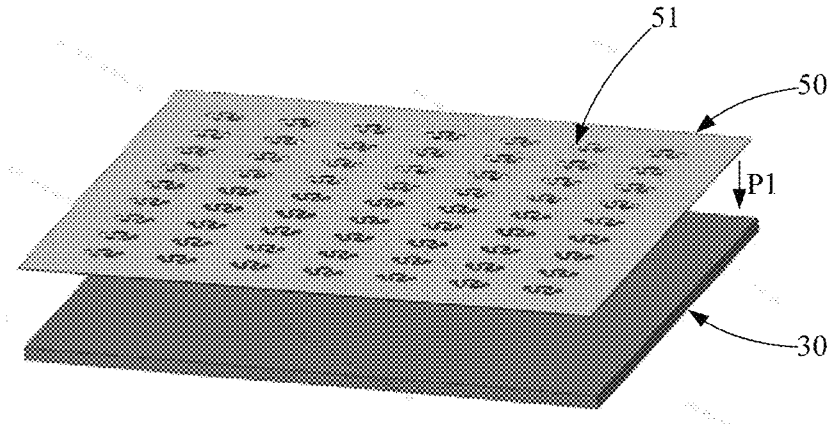
FIG. 6 is a schematic diagram of performing surface mounting during preparation of a vaporization assembly according to an embodiment.
Figure 7:
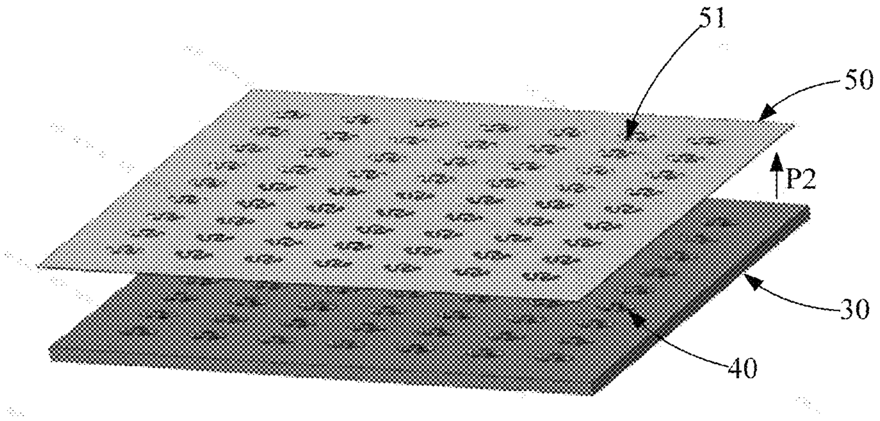
FIG. 7 is a schematic diagram of removing a mesh plate after laser printing during preparation of a vaporization assembly according to an embodiment.
Figure 8:
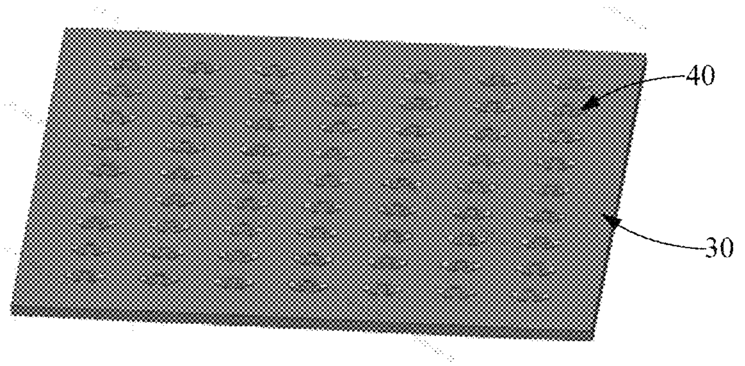
FIG. 8 is a schematic diagram of a vaporization assembly obtained through sintering during preparation of a vaporization assembly according to an embodiment.

Further, to reflect the feasibility of preparing the vaporization assembly according to the SMT-based laser printing process in this application, in an embodiment, a detailed step process is shown in FIG. 6 to FIG. 8 and includes:

S10: Obtain the sheet-shaped porous body 30 in the foregoing figures, where a material of the porous body is a diatomite porous ceramic body to which aluminum oxide and glass powder are added and that may be directly purchased or autonomously fired.

S20: Prepare a printing slurry of the resistance heating trajectory 43, where components of the slurry include:

components for a solid-phase heating function, where the foregoing electric heating metal or alloy powder is used, a fineness thereof is 600 meshes, a shape thereof is similar to a sphere, and a content in percentage by weight thereof in solid-phase components of the slurry approximately ranges from 80 wt % to 90 wt %;

glass-phase components for curing, where $SiO_2$ glass powder, $Al_2O_3$, MgO, CaO, or a mixture thereof is used, a particle size thereof approximately ranges from 4 μm to 5 μm, and a content in percentage by weight thereof in the solid-phase components of the slurry approximately ranges from 1 wt % to 10 wt %; and liquid auxiliary agent components assisting in slurry printing, where the liquid auxiliary agent components may be obtained by purchasing laser printing organic auxiliary agents sold on the market, where the components generally include a solvent, a thickening agent, a leveling agent, a surface active agent, or a thixotropic agent, and a content in percentage by weight of an addition ratio in the solid-phase components ranges from 10 wt % to 20 wt %.

S30: Perform SMT mounting, where as shown in FIG. 6, a laser printing mesh plate 50 provided with a hollow 51 shaped as the heating element 40 shown in FIG. 2 is mounted on a surface of the porous body 30 in step S10 for the vaporization surface 320, and the mesh plate is generally a steel mesh plate.

S40: Print, through a laser printing device, the printing slurry prepared in step S20 on the surface of the porous body 30 on which the laser printing mesh plate 50 is mounted, and strip or remove the laser printing mesh plate 50 after printing is completed, so that the heating element 40 is formed on the surface of the porous body 30 through deposition, as shown in FIG. 7.

S50: Sinter for curing, where after the porous body 30 obtained through step S40 is baked in a furnace at 100° C. for 20 min, the porous body is then transferred to a protective atmosphere furnace ranging from 1100° C. to 1150° C. in a sintering furnace for sintering for 30 min, so that vaporization assemblies produced in batch may be obtained after sintering, as shown in FIG. 8. A large amount of vaporization assemblies may be subsequently obtained by performing cutting separation by using a grinding wheel.

In the process of preparing the printing slurry of the resistance heating trajectory 43 in step S20, the solid-phase components may be first obtained according to a required ratio; the liquid auxiliary agent components is then added after the solid-phase components are uniformly mixed through ball milling for several time; and after the components are mixed, the components are rolled by using a three roll milling machine, so that solid-phase powder is uniformly distributed in an organic phase of the liquid auxiliary agent, thereby obtaining a printing slurry with suitable viscosity; and the printing slurry is then placed in a refrigerated cabinet at 16° C. and is used after the slurry is aged for a period of time to obtain a more stable trait.

A printing slurry layer of a required thickness is obtained through printing by using a laser printing device in a laser printing manner, which is more convenient and has higher precision than a slurry layer of the required thickness formed through a plurality of times of printing and thickening in a screen printing process. In addition, no pattern formed through laser printing overflows, so that a stereoscopic effect is relatively strong and the printing is beautiful. The laser printing process has a simple procedure, high printing efficiency, and low costs, which is suitable for industrial mass and automated production.

Figure 9:
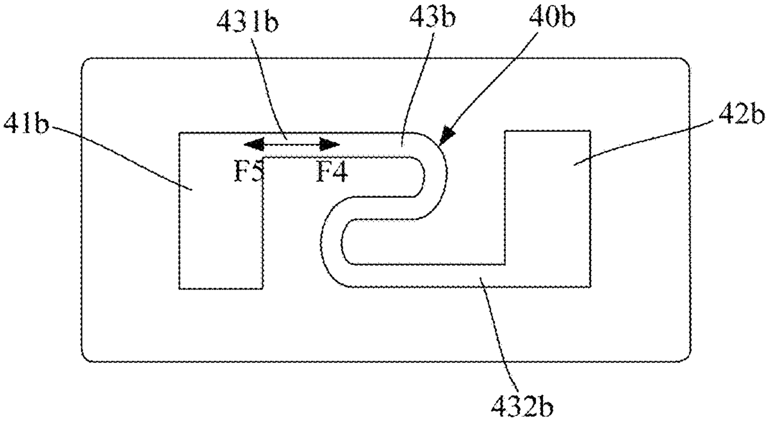
FIG. 9 is a schematic structural diagram of a heating element according to a comparative embodiment.

Further, to reflect the progress of the vaporization assembly shown in FIG. 2 and FIG. 4 in this application than an existing vaporization assembly, performance tests are performed on the vaporization assembly of the embodiments of this application, and the tests include a cracking test under cold-hot impact and a temperature field distribution test. In the tests, a heating element 40*b*/40*c* shown in FIG. 9 and FIG. 10 is used for comparison. A resistance heating trajectory 43*b* shown in FIG. 9 is a comparison example of a first part 431*b* and/or a second part 432*b* that is conventionally flat-straight. FIG. 10 is a comparison example by further increasing the extension length of the resistance heating trajectory 43 in FIG. 2.

S100 cracking test: cold-hot cycling is performed on the resistance heating trajectories of the vaporization assemblies shown in FIG. 2 and FIG. 9, and cracking situations under cold-hot cycling impact are tested. Specifically, the test includes:

Under a condition of a constant power of 6.5 W of a direct current power supply, cold-hot cycling impact is performed on the resistance heating trajectories by using 3 seconds of power-on and 15 seconds of power-off as a cycle, to continuously observe cracking situations of the resistance heating trajectories under a visible microscope, and each group of experiment includes 5 replicates. For results, reference may be made to FIG. 10 to FIG. 13.

Figure 11:
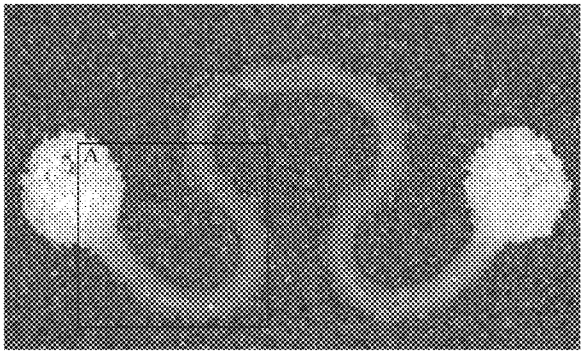
FIG. 11 is an electron microscope observation diagram of a heating element after a cold-hot cycling test according to an embodiment.
Figure 12:
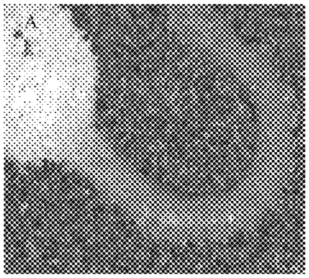
FIG. 12 is an enlarged view of a position A in FIG. 11.

In the results, FIG. 11 shows an entire microscopic morphology of the vaporization assembly shown in FIG. 2 under an electron microscope after cycling is performed on the resistance heating trajectory 43 for 50 times; and FIG. 12 shows a partial enlarged view of a position A in FIG. 11. As can be seen from FIG. 11 and FIG. 12, the resistance heating trajectory 43 is still in a good state, and no crack appears under observation of the microscope. In addition, the first electrode connection portion 41 and the second electrode connection portion 42 whose both ends are used as electrodes adopt silver-platinum alloy powder with high conductive performance and are substantially in white.

Figure 13:
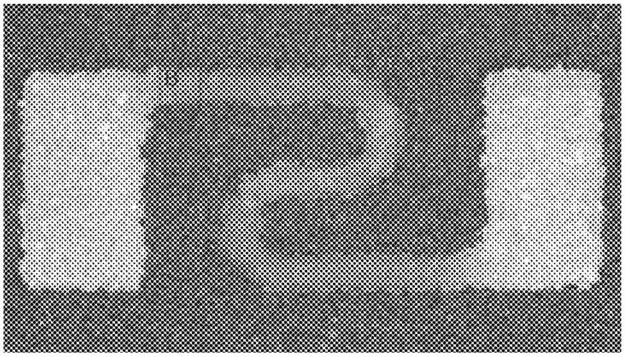
FIG. 13 is an electron microscope observation diagram of a heating element after a cold-hot cycling test according to a comparative embodiment.
Figure 14:
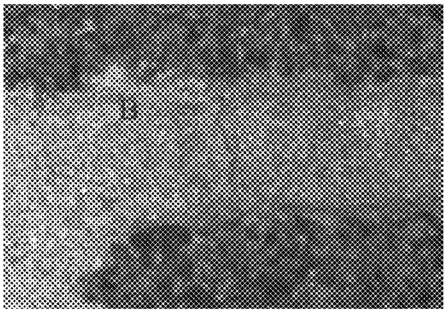
FIG. 14 is an enlarged view of a position B in FIG. 13.

FIG. 13 shows an entire microscopic morphology of the vaporization assembly under an electron microscope when a crack appears after cycling is performed on the resistance heating trajectory 43*b*; and FIG. 14 is a partially enlarged view of a position B in FIG. 13. As can be seen from FIG. 14, in statistics, the resistance heating trajectory 43*b* has a crack at the first part 431*b*, and an average cycle of appearance of cracks during the test is 25 times. A reason for the appearance of cracks lies in that the first part 431*b* is in a flat-straight shape, tensile stress F4 and F5 opposite to each other along an extending direction shown in FIG. 9 is generated due to a temperature difference on two sides, and once the temperature difference is excessively great, a difference between F4 and F5 exceeds a threshold, and a crack is formed.

S200 temperature field test: vaporization assemblies prepared using the shape of the porous body 30*d* shown in FIG. 5 and the resistance heating trajectories 43/43*a*/43*b*/43*c* according to the foregoing embodiments and comparison embodiments is used, and a constant power of 6.5 W is loaded, to simulate a temperature field after 1 second of dry burning. In the test, convection and radiation heat dissipation are not considered, and for results, reference may be made to FIG. 15 to FIG. 19. Certainly, for mutual comparison in the test, materials of the vaporization assemblies of the examples are all the same, and the following table shows related parameters.

Figure 15:
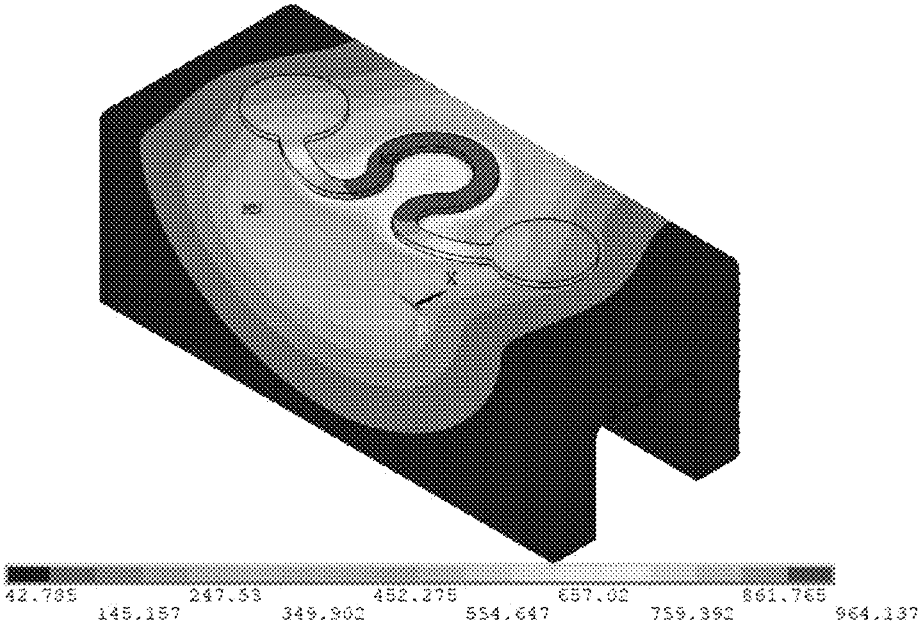
FIG. 15 is a schematic diagram of a temperature field of a vaporization assembly according to an embodiment.

Resistance Heating Trajectory
Fe—Cr alloy Thermal conductivity 12.8 W/m/K
Specific heat capacity 490 J/kg/° C.
Density 7200 kg/m$^3$
Porous Ceramic Body
Aluminum oxide-Zirconium oxide Thermal conductivity 1 W/m/K
Specific heat capacity 430 J/kg/° C.
Density 900 kg/m$^3$ In the test results, a maximum temperature of the resistance heating trajectory 43 in a schematic result diagram of a temperature field of the vaporization assembly shown in FIG. 15 is 964.14° C., and it can be seen from FIG. 15 that temperatures in a main heat radiation region (a central yellow region) are substantially uniform. In addition, in the results, a temperature difference on the first part 431/the second part 432 approximately ranges from 100° C. to 150° C.

Figure 16:
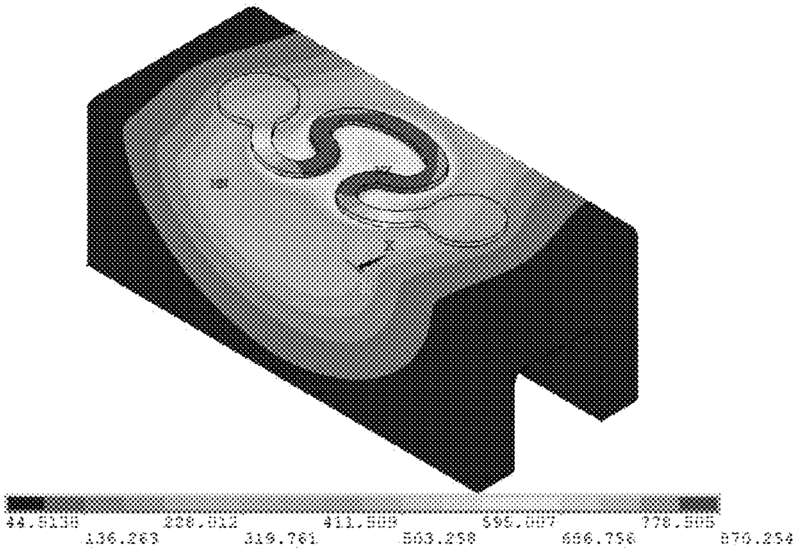
FIG. 16 is a schematic diagram of a temperature field of a vaporization assembly according to another embodiment.

FIG. 16 is a schematic result diagram of a temperature field of a flattened instance by reducing a size of the resistance heating trajectory 43 in FIG. 15 along the width direction of the vaporization surface 320. A shape of an entire heat radiation region is substantially the same as that in FIG. 15, and because the size of the trajectory is flattened, a resistance value thereof changes, the maximum temperature is decreased to 870.25° C., and the temperatures in the main heat radiation region are substantially uniform. The temperature difference on the first part 431/the second part 432 also approximately ranges from 100° C. to 150° C.

Figure 17:
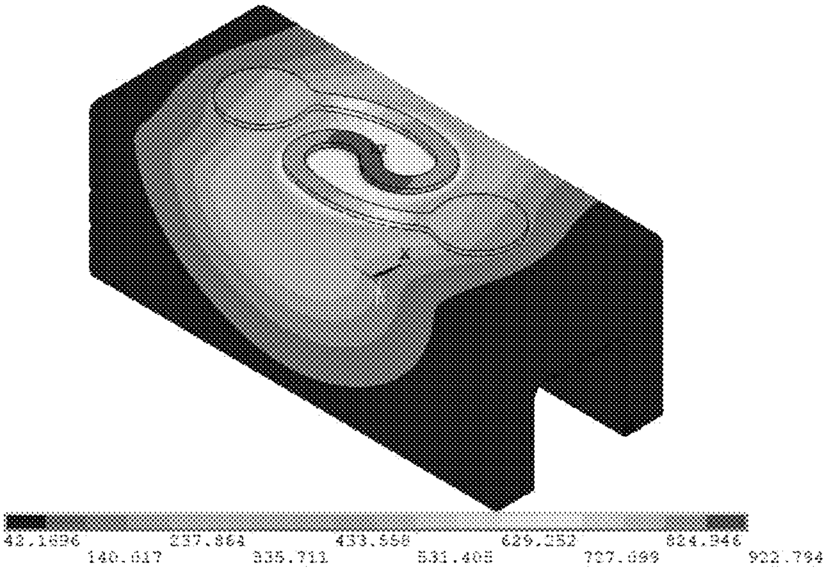
FIG. 17 is a schematic diagram of a temperature field of a vaporization assembly according to still another embodiment.

FIG. 17 is a schematic result diagram of a temperature field of the resistance heating trajectory 43*a* of the instance shown in FIG. 4. The maximum temperature of the resistance heating trajectory 43*a* in this shape is 922.794° C., the main heat radiation region is smaller than those shown in FIG. 15 and FIG. 16, and the temperature difference on the first part 431*a*/the second part 432*a* is increased and approximately ranges from 180° C. to 200° C.

Figure 18:
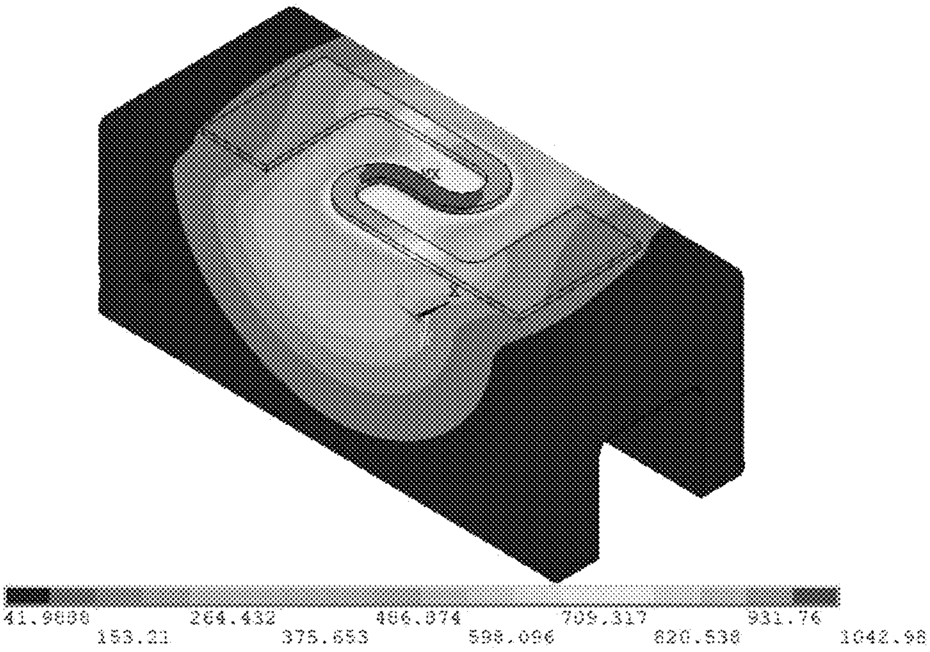
FIG. 18 is a schematic diagram of a temperature field of a vaporization assembly according to a comparative embodiment.

FIG. 18 is a schematic result diagram of a temperature field of the resistance heating trajectory 43*b* of the comparison example shown in FIG. 9. The maximum temperature of the resistance heating trajectory 43*b* is 1042.98° C., an area of the main heat radiation region is smaller, and the uniformity is poorer than those of the foregoing examples. In addition, the temperature difference on the first part 431*b*/the second part 432*b* in a flat-straight shape exceeds 300° C., which is more prone to deformation and generation of stress under cold-hot impact.

Figure 19:
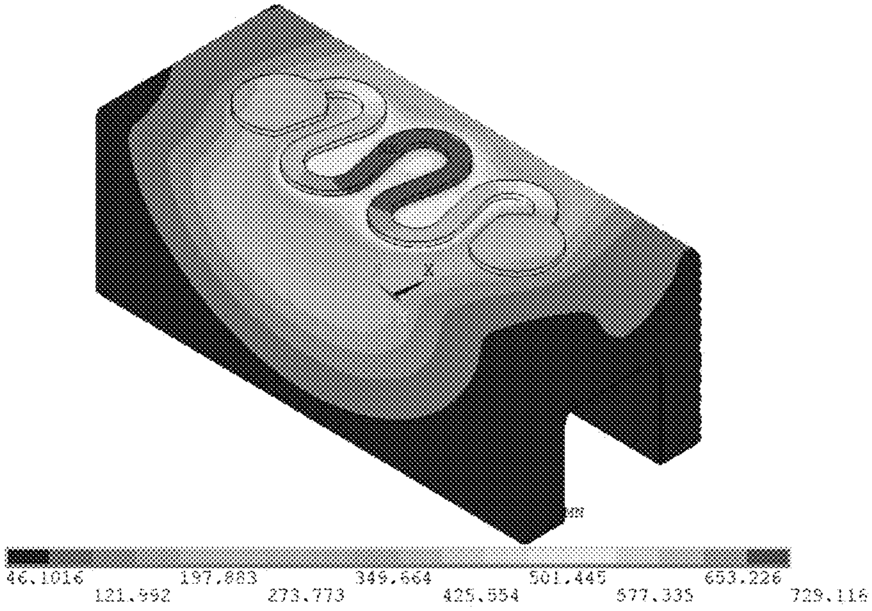
FIG. 19 is a schematic diagram of a temperature field of a vaporization assembly according to another comparative embodiment.

FIG. 19 is a schematic result diagram of a temperature field of the resistance heating trajectory 43*c* of the comparison example shown in FIG. 10. Because an extension length of the resistance heating trajectory 43*c* along the length direction of the vaporization surface is increased, a resistance value is increased, a heating temperature is slightly decreased, the maximum temperature is only 729.116° C. In addition, an area of the entire temperature radiation region is correspondingly increased, but the heat utilization is relatively low. Meanwhile, the first part 431*c*/the second part 432*c* is farther from a center region, so that the temperature difference on two ends is about 250° C.

Figure 20:
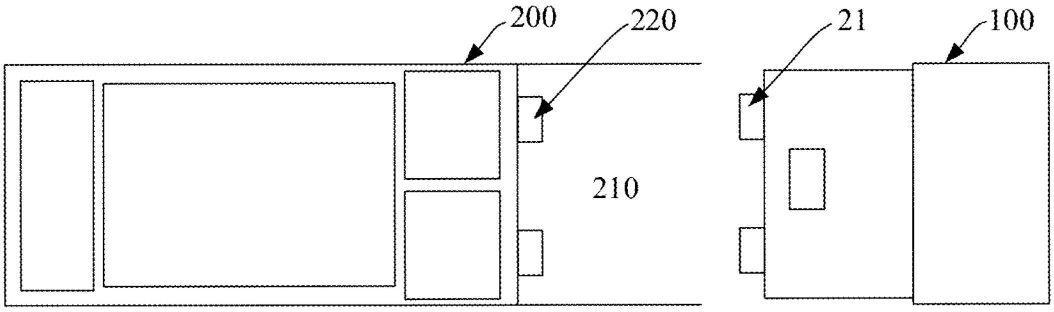
FIG. 20 is a schematic structural diagram of an e-cigarette according to an embodiment.

Another embodiment of this application further provides an e-cigarette. FIG. 20 shows a schematic structural diagram of the e-cigarette, which includes a vaporization apparatus 100 and a power supply apparatus 200 configured to supply power to the vaporization apparatus 100. The power supply apparatus 200 is provided with a receiving cavity 210 configured to at least partially receive the vaporization apparatus 100, and a positive electrode and a negative electrode 220 of the power supply apparatus 200 are configured to form a closed electric circuit with an electrode 21 of the vaporization apparatus 100, to further supply power to the vaporization apparatus 100. The vaporization apparatus 100 may include the e-cigarette vaporizer shown in FIG. 1.

It should be noted that, the specification and the accompanying drawings of this application provide preferred embodiments of this application, but this application is not limited to the embodiments described in this specification. Further, a person of ordinary skill in the art may make improvements or modifications according to the foregoing description, and all of the improvements and modifications shall all fall within the protection scope of the attached claims of this application.

What is claimed is:

1. An e-cigarette vaporizer, configured to vaporize a liquid substrate to generate inhalable aerosols, and the e-cigarette vaporizer comprising:

a liquid storage cavity, configured to store the liquid substrate;

a porous body, in fluid communication with the liquid storage cavity to absorb the liquid substrate; and a heating element, formed on the porous body and configured to heat the liquid substrate in at least a part of the porous body to form aerosols, wherein the heating element comprises a first electrode connection portion, a second electrode connection portion, and a resistance heating trajectory extending between the first electrode connection portion and the second electrode connection portion; the resistance heating trajectory comprises a first part close and connected to the first electrode connection portion and a second part close and connected to the second electrode connection portion; and a curvature of any position on the first part and/or the second part is not zero;

wherein the resistance heating trajectory is in a circuitous or alternately bending shape;

wherein the resistance heating trajectory comprises a first bending direction change point adjacent to the first electrode connection portion and a second bending direction change point adjacent to the second electrode connection portion, a part between the first bending direction change point and the first electrode connection portion forms the first part, and a part between the second bending direction change point and the second electrode connection portion forms the second part;

wherein the resistance heating trajectory further comprises at least one third part located between the first bending direction change point and the second bending direction change point, wherein bending directions of the at least one third part and the first part are opposite; and/or bending directions of the third part and the second part are opposite; and wherein a straight line running through a joint of the first part and the first electrode connection portion and the first bending direction change point is provided in the vaporization surface, and the straight line comprises an intersection point with the third part; and a distance between the joint of the first part and the first electrode connection portion and the first bending direction change point is less than a distance between the first bending direction change point and the intersection point.

2. The e-cigarette vaporizer according to claim 1, wherein the first part and the second part are symmetrical.

3. The e-cigarette vaporizer according to claim 1, wherein the resistance heating trajectory is constructed to comprise only limited points whose curvature is zero in the entire trajectory.

4. The e-cigarette vaporizer according to claim 1, wherein the resistance heating trajectory is constructed to be connected to the first electrode connection portion and the second electrode connection portion; and a straight line runs through a connection point between the resistance heating trajectory and c2 the first electrode connection portion or the second electrode connection portion and intersects with the resistance heating trajectory at two intersection points, wherein a distance between the two intersection points is greater than a distance between the connection point and an adjacent intersection point.

5. The e-cigarette vaporizer according to claim 1, wherein the first part and/or the second part are/is constructed to be in a shape of an arc with a constant curvature.

6. The e-cigarette vaporizer according to claim 1, wherein a curvature of the first part varies; and/or a curvature of the second part varies.

7. The e-cigarette vaporizer according to claim 1, wherein the porous body comprises a vaporization surface, and the heating element is formed on the vaporization surface, the vaporization surface is a flat plane.

8. The e-cigarette vaporizer according to claim 7, wherein the vaporization surface comprises a length direction and a width direction perpendicular to the length direction;

the first electrode connection portion and the second electrode connection portion are sequentially arranged along the length direction; and an area of a region defined by a straight line running through a joint of the first part and the first electrode connection portion along the width direction and a straight line running through a joint of the second part and the second electrode connection portion along the width direction in the vaporization surface is less than two thirds of an area of the vaporization surface.

9. The e-cigarette vaporizer according to claim 7, wherein the vaporization surface comprises a length direction and a width direction perpendicular to the length direction; and the first part and/or the second part are/is constructed to bend outward along the width direction.

10. The e-cigarette vaporizer according to claim 1, wherein bending directions of the first part and the second part are opposite.

11. The e-cigarette vaporizer according to claim 1, wherein a curvature of the first part and/or the second part is greater than that of the third part.

12. The e-cigarette vaporizer according to claim 1, wherein a width of the resistance heating trajectory ranges from 0.2 mm to 0.5 mm; and/or an extension length of the resistance heating trajectory ranges from 5 mm to 50 mm; and/or a resistance value of the resistance heating trajectory ranges from 0.5 Ω to 2.0 Ω.

13. The e-cigarette vaporizer according to claim 8, wherein the first electrode connection portion and/or the second electrode connection portion are/is basically located in a center of the vaporization surface along the width direction.

14. The e-cigarette vaporizer according to claim 1, wherein the porous body comprises a porous ceramic body.

15. An e-cigarette, comprising a vaporization apparatus configured to vaporize a liquid substrate to generate inhalable aerosols and a power supply apparatus configured to supply power to the vaporization apparatus, wherein the vaporization apparatus comprises the e-cigarette vaporizer according to claim 1.

16. A vaporization assembly for an e-cigarette, comprising a porous body configured to absorb a liquid substrate and a heating element formed on the porous body, wherein the heating element comprises a first electrode connection portion, a second electrode connection portion, and a resistance heating trajectory extending between the first electrode connection portion and the second electrode connection portion; the resistance heating trajectory comprises a first part close and connected to the first electrode connection portion and a second part close and connected to the second electrode connection portion; and a curvature of any position on the first part and/or the second part is not zero;

wherein the resistance heating trajectory is in a circuitous or alternately bending shape;

wherein the resistance heating trajectory comprises a first bending direction change point adjacent to the first electrode connection portion and a second bending direction change point adjacent to the second electrode connection portion, a part between the first bending direction change point and the first electrode connection portion forms the first part, and a part between the second bending direction change point and the second electrode connection portion forms the second part;

wherein the resistance heating trajectory further comprises at least one third part located between the first bending direction change point and the second bending direction change point, wherein bending directions of the at least one third part and the first part are opposite; and/or bending directions of the third part and the second part are opposite; and wherein a straight line running through a joint of the first part and the first electrode connection portion and the first bending direction change point is provided in the vaporization surface, and the straight line comprises an intersection point with the third part; and a distance between the joint of the first part and the first electrode connection portion and the first bending direction change point is less than a distance between the first bending direction change point and the intersection point.

* * * * *